Dec. 18, 1962  K. LEWIS  3,069,014
SWIMMING POOL FILTER DEVICE
Filed April 20, 1959  2 Sheets-Sheet 1
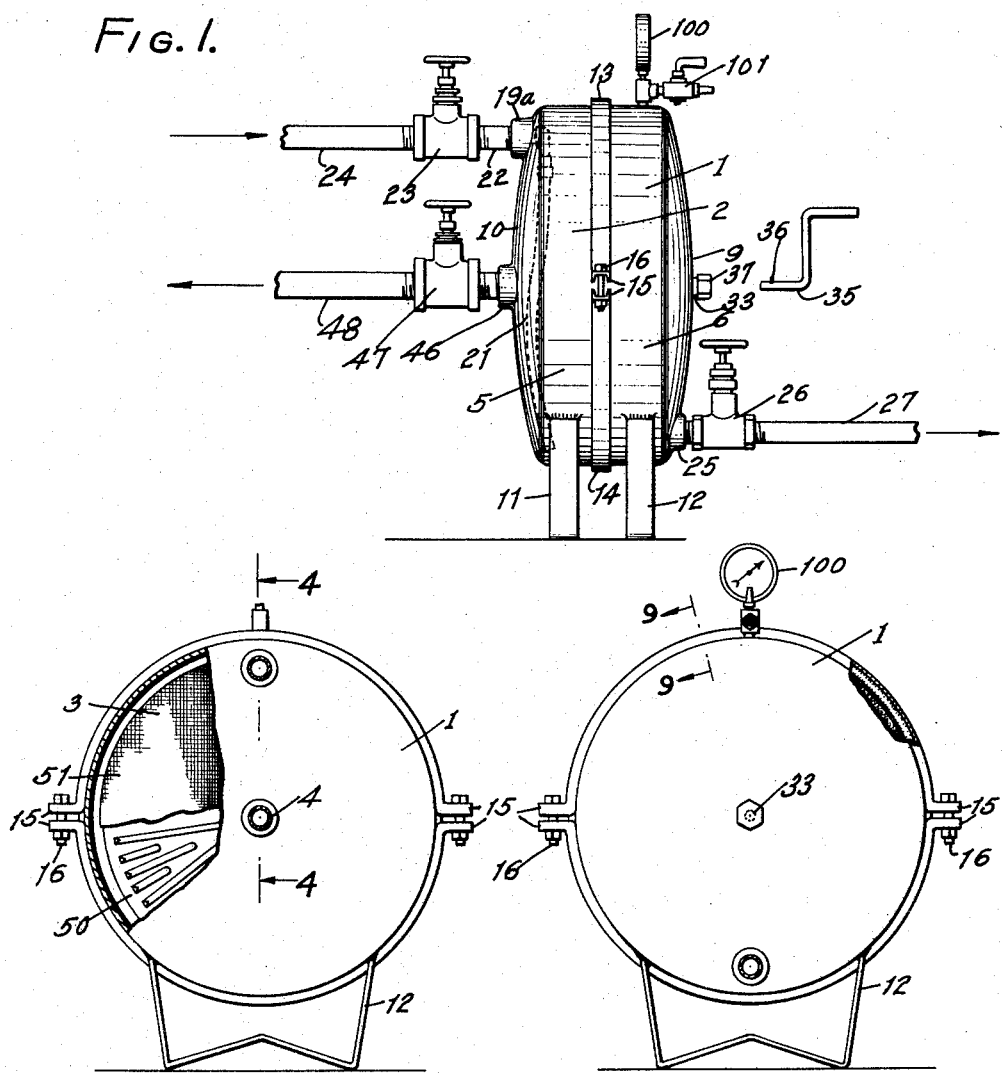
Fig. 1.
Fig. 2.
Fig. 3.
Fig. 6.
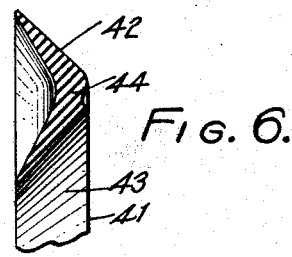
INVENTOR,
KENNETH LEWIS;
BY
ATTORNEY

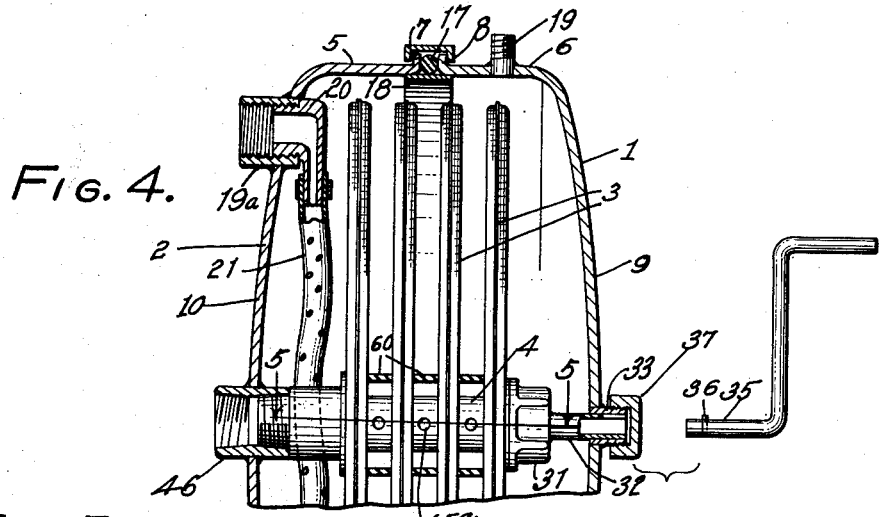
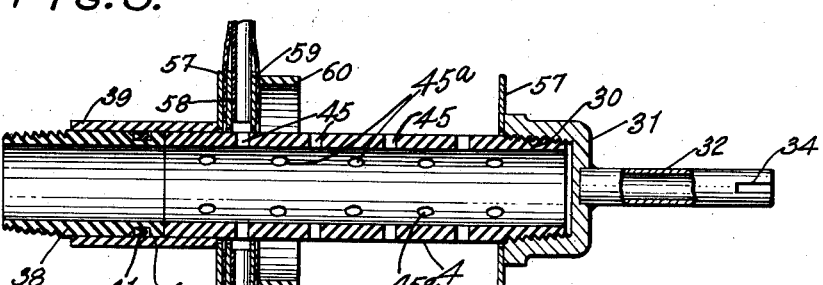
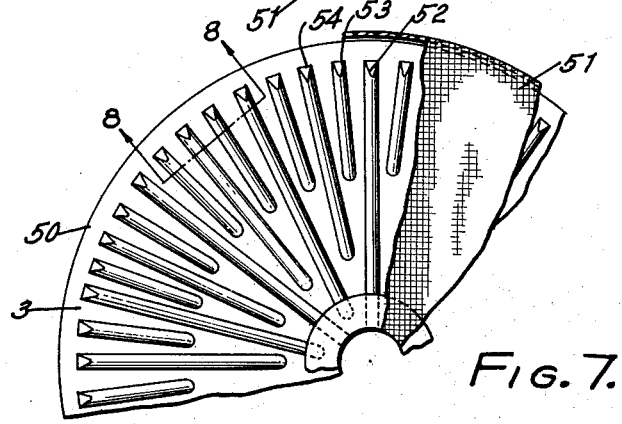
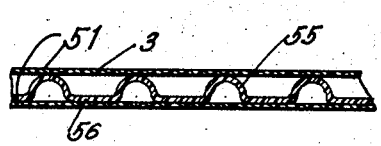

United States Patent Office 3,069,014
Patented Dec. 18, 1962

3,069,014
SWIMMING POOL FILTER DEVICE
Kenneth Lewis, 11201 S. Garfield Ave., South Gate, Calif.
Filed Apr. 20, 1959, Ser. No. 807,655
3 Claims. (Cl. 210—169)

The present invention relates to a filter device of a type which is primarily adapted for the rapid and efficient cleaning of the water in a swimming pool. The filter device is of the continuous flow type; that is, the water in the pool may be pumped continuously therefrom and into the filter device to clean the water and to return the water to the pool in a continuous cycle.

The usual filter device construction, and particularly that type of filter which includes diatomaceous earth is usually cleaned in one of two ways, to wit: the draining of the filter tank and the removal therefrom of elements therein which are dirty followed by washing from said elements the diatomaceous earth and accumulated dirt and silt. A second method employed is known as a back-wash system and wherein the water from the pump is reversed and run into a well. The reversed flow of water directs the trapped diatomaceous earth and dirt to a drain. However, hundreds of gallons of water must be pumped in reverse flow to accomplish removal of all dirt and is very time consuming.

Once a filter is installed it has been found that substantially one hundred percent of the maintenance is in the cleaning of the filter of the dirt which it collects.

An object of the present invention is to permit the filter to be cleaned of all dirt in a minimum of time and without wastage of a large gallonage of water.

A further object is the rapid cleaning of the filter without the necessity of opening the filter tank and removing the dirty elements for washing.

Other objects include a filter device which is attractive in appearance, efficient in operation which allows a filter to be cleaned within a matter of minutes, is not wasteful of water and allows continuous flow of water through the filter device for maintaining the water in the pool in clean condition and free from deleterious materials.

In the drawings:

FIGURE 1 is a fragmentary end elevation of the filter device of the invention showing pipe connections;

FIGURE 2 is a fragmentary, partially sectional side elevation of the filter device shown in FIGURE 1;

FIGURE 3 is an end elevation, partly in fragment and in section of the filter device shown in FIGURE 1 and looking from the right to the left of said FIGURE 1;

FIGURE 4 is an enlarged fragmentary and sectional view of the filter device taken substantially on the line 4—4 of FIGURE 2;

FIGURE 5 is a fragmentary, longitudinal sectional view on an enlarged scale on the line 5—5 of FIGURE 4 one filter being shown;

FIGURE 6 is a fragmentary, partially sectional view of a gasket member which may be utilized for the tubular fitting shown in FIGURE 5;

FIGURE 7 is a fragmentary, partially sectional face view of elements of a filter utilized in the invention;

FIGURE 8 is an enlarged sectional view on the line 8—8 of FIGURE 7; and,

FIGURE 9 is a fragmentary, enlarged sectional view on the line 9—9 of FIGURE 3.

Referring now to the drawings.

The invention includes casing or tank of two part construction 1 and 2 within which are filters designated generally as 3 which are of annular disk form as shown in FIGURE 7, which filters are axially carried upon a tubular shaft 4 and which shaft is adapted to be rotated, as will hereinafter be set forth.

Both casing or tank parts are substantially identical in construction, the difference residing in the fittings, and the casing parts 1 and 2 are each provided with a curved end wall 5 and 6 the edges thereof terminating in upstanding annular flanges 7 and 8, with side walls 9 and 10 of concavo-convex, or domed form. The casing halves each carry supports such as shown at 11 and 12 of substantially W type, see FIGURES 2 and 3. The casing halves are held together by means of a pair of channel bands 13 and 14, the channel portions of each band enclosing the flanges 7 and 8 of the casting parts 1 and 2 as shown in FIGURE 4, and each band terminates in an outwardly extended flange designated generally as 15 for each band with bolts 16 carrying nuts passed through bores in the said flanges 15 for securing the two bands together. Prior to securing the flange portions of the bands together, I provide between the flanges 7 and 8 an O-ring or other gasket means 17 together with a circular band 18 which bridges the space beneath the flanged ends of said casing parts 1 and 2 as shown in FIGURE 4. This construction allows the casing parts 1 and 2 to be held in fluid tight relationship. The curved end wall 6 for the casing part 1 is provided with a fitting 19 leading to the interior of the casing parts, which fitting is adapted to receive a pressure gauge 100 and relief cock 101. The casing part 2 has a fitting 19a to which fitting is secured an L fitting 20, the latter fitting being within the curved end wall 5. This fitting has clamped, or otherwise secured thereto a tube 21 which may be flexible and preferably of oval form in transverse section and which tube is provided with perforations for the purpose of allowing water when directed through said tube to flow through said perforations and into the casing. The fitting 19a has secured thereto a short pipe extension 22 which connects with a valve 23 and the valve in turn through suitable piping 24 leads to the pool skimmer through suitable pump means. The casing part 1 adjacent the leg portions or supports is provided with a fitting 25 leading to a valve 26, which valve in turn connects with a drain pipe 27.

The tubular shaft 4 (FIG. 5) is provided with pipe threads 30 for receiving a cap type nut 31. This nut has secured thereto a tube 32 which extends through an axial fitting 33 in the side wall 9 of the casing part 1. This tube is provided with a longitudinal slot 34 and the tube 32 is adapted to receive one end 35 of a crank, the end 35 carrying a transverse pin 36 for reception in the slot 34. When the crank end 35 is not being used, a cap nut 37 is secured to the member 33, as shown in FIGURE 4. However, as shown in FIGURE 5, the tube 32 does not communicate with the interior of the tubular shaft 4. The end of the tubular shaft 4 opposite its threaded end, abuts an end of a tubular fitting 38, and this portion of the tubular shaft and the fitting 38 is surrounded by a sleeve 39 for holding the parts in juxtaposition, with the fitting 38 formed with an annular groove 40 within which is positioned a gasket 41 of the type best shown in FIGURE 6. This may be designated as a V type or chevron gasket in that it has a pair of angularly related parts 42 and 43 of equal size and joined together as shown at 44. The angularity between the parts 42 and 43 is decreased when the gasket is placed within the groove 40 by engagement with the sleeve 39 in one instance and with the bottom wall bounding the groove 40 in the second instance.

It will be observed that the tubular shaft 4 is provided with an annular series of spaced transverse bores designated generally as 45. These bores permit communication externally of said shaft and internally thereof, and outwardly through the fitting 38. The pipe threaded end of the fitting 38 is in threaded engagement with a collar 46 which extends transversely and axially of the side wall 10 of the casing part 2. The collar connects with a valve 47 and the valve in turn through a suitable pipe 48 returns the filtered water to the pool.

Each filter 3 includes a disk type annular septum 50 with an envelope or external covering of fibrous material 51. The septum may be formed from various materials such as plastic, metal or wood, although I prefer plastic for the reason that it is rust proof and easily molded to form. In the present instance, the septum 50 is provided with a series of radial grooves as shown in FIGURE 7 at 52, 53 and 54. These grooves are of different lengths with the groove 52 extending to the central bore of the disk or septum while the grooves 53 and 54 extend appropriate lengths so as to leave clearance between the grooves. This construction is shown in FIGURE 8 wherein it will be observed that the outer fabric coverings 51 are spaced apart by the grooves. By so forming the grooves in the septum, spaced apart concavo-convex portions 55 are provided and one face of the septum, to wit: 56 is substantially flat or planar, with one fabric covering engaging the same while the opposite fabric covering engages the convex surface portions 55. As best seen at the top of FIG. 7 the envelope formed by the fabric coverings 51 is quite loose hence water can readily pass over the periphery of the septum as well as over the ribs 55 and under the flat portions of the septum as seen in FIG. 8. Each disk or septum of a series of disks which make up the filters, is mounted upon the tubular shaft 4 in such a manner that the grooves therein communicate with the annular series of perforations or bores 45. At least the areas included between the septum and each fabric covering will communicate with an annular series of perforations or bores 45, and in the manner shown best in FIGURE 5. In this figure, the first filter disk has washers 57 and 58 on both sides of a fabric covering 51 with the washer 57 bearing against an end of sleeve 39 while the other washer 58 bears against the septum. A washer 59 is interposed between the opposite facing fabric member and the septum. Surrounding the tubular shaft 4, for the purpose of spacing the respective filter disks, so that the area between the septum and each fabric covering will have communication with an annular series of bores 45, is an enlarged diameter spacing ring 60. The spacing ring has a diameter considerably greater than the diameter of the tubular shaft 4 and said spacing ring is conveniently held by either frictional engagement between pairs of disks or by clamp engagement through the medium of the cap nut 31 and said sleeve 39. Thus a series of filter disks may be mounted upon the shaft in the manner shown in FIGURE 4 with spacing rings therebetween to assure that there is a flow of water through the fabric sides of the disks into the tubular shaft through the bores 45 and thence outwardly through fitting 38.

It will be observed that the shaft 4 may be rotated by the crank to rotate in turn the filter disks without in any manner disturbing the connection between the fitting 38 which does not rotate and collar 46 due to the fact that fitting 38 is separated from the tubular shaft 4, as shown in FIGURE 5.

The operation, uses and advantages of the invention just described, are as follows:

When it is desired to use the device for filter purposes, filter aid such as diatomacious earth is placed in the line 24 which leads from the pool skimmer through a pump. A given amount of diatomaceous earth will be directed within the casing when the valve 23 is opened with valve 26 closed. The perforated tube 21 has a closed end and the diatomaceous earth and water will be sprayed within the two-part casing and against the fabric covering 51 for each disk septum 3 to thoroughly coat the exterior surfaces of said fabric covering with diatomaceous earth. It is evident that any dirt from the pool water will be removed upon contact with the diatomaceous earth covering the fabric filters and that the clarified water will pass through said fabric and flow through the channels of the septum into the bores 45 and thence into the tubular shaft. I also provide bores 45a intermediate the bores 45 and any water received between the periphery of the shaft 4 and the spacer rings 60 will pass through the bores 45a. This type of filter device will thoroughly clean pool water flowing thereto and return clean water to the pool. As dirt accumulates upon the surface of the diatomaceous earth, back pressure builds up in the water flow and this increased pressure is indicated by the pressure gauge at 100. If the pressure builds to an extent that the filter is not operating efficiently, the filter should be cleaned, and to accomplish this the pump which directs water under pressure from the pool skimmer through the pipe 24, past valve 23 into the two-part casing or tank, is shut off followed by opening the cock 101 while leaving the valves at 23 and 47 open. Under this condition air will enter the tank or casing and the level of the water will drop to a point substantially one-half the height of the tank or casing; i.e., to the tank axial level. The crank handle is then inserted into tube 32 and the crank rotated in one direction so that the dirt encrusted diatomaceous earth sweeps through the water in the tank or casing and under centrifugal force is removed from the fabric covering of each filter. After a certain number of revolutions of the disk filters, the valve 26 may be opened and the diatomaceous earth and water will pass through line 27 to a sump or point of disposal. To assure that the filters are clean, the pump may be actuated to again direct water under pressure into the casing, valve 26 being left open to assure by observation that clean water is passing out of the pipe 27. The cock at 101 is then closed as is likewise the valve 26 and the pump for directing water under pressure through the line 24 again energized. An amount of clean diatomaceous earth is included in the flow of the water through pipe 24 to the interior of the casing or tank and this clean diatomaceous earth will coat the fabric covering of each filter disk. This operation requires but a few minutes of time as compared to the time expended in prior devices with the use of a large gallonage of water.

It may be mentioned that I have found it expedient to use for the fabric covering, a pre-shrunk Dacron polyester cloth. The grooved septum allows for an unobstructed, continuous and abundant flow of water. When the filter device is in operation; i.e., when the valves 23 and 47 are opened, the filter disks are not rotated but remain stationery. It is only when it is desired to clean the filter disks that the said disks are rotated.

If it becomes necessary to make repairs to the filter device, it is evident that the pump may be idled and the tank or casing opened by removing the bolts at 16 whereupon the two casing halves may be separated.

In filter devices of the character described, corrosion, and rusting, are always factors and the present filter device lends itself to the use of plastic for the tubular shaft 4 and parts associated therewith. Furthermore, the interior of the tank may be coated with corrosion and rust resistant material such as porcelain and other well-known materials.

I claim:

1. A swimming pool filter device including a drum type casing, supply means for admitting water from the pool under pressure to the interior of the casing, and discharge means for passing filtered water from the casing back to the swimming pool, said discharge means including a rotatable tubular shaft positioned axially within said casing and having a spaced series of perforations, a plurality of spaced filter units mounted on the tubular shaft in communication with said perforations, each filter unit including a disk provided with spaced, radially positioned, concavo-convex ribs on one face of the disk and forming radial grooves on the opposite face of the disk which is substantially flat, the ribbed face of at least one disk facing said supply means, an envelope of a smooth surface cloth woven of synthetic fibers covering each disk, a covering of filter aid held on said envelopes, rings of greater diameter than the tubular shaft positioned between proximate filter units, said tubular shaft having an additional series of perforations communicating with the spaces between the rings and the shaft for discharging water leaking into said space, means for admitting air and lowering the water in the casing to uncover a portion of the cloth envelopes, means for rotating the tubular shaft and the filter units at a speed to throw the filter aid and collected dirt from the cloth envelopes into the water within the casing; and drain means to withdraw the water and thrown material from the casing, whereby during the filtering operation water from the swimming pool passes from the supply means through the cloth envelopes, the radial grooves, and finally through the shaft perforations and is discharged from the casing through the tubular shaft for return to the pool as filtered water, and during the cleaning of the filter the rotation of the tubular shaft and filter units readily sheds the filter aid and collected dirt, thus avoiding the use of scrapers.

2. A swimming pool filter device including a drum type casing having a supply means for admitting water from the pool under pressure to the interior of the casing, drain means for removing water from the casing, and discharge means for passing filtered water from the casing, said discharge means including a central hollow shaft rotatable in the casing, and having axially spaced perforations; a plurality of filter units mounted on said shaft, each unit being in communication with one of the perforations and including a septum disk having radial ribs of varying lengths on one face and corresponding grooves on the opposite face, and a cover woven of Dacron polyester cloth loosely enveloping the disk with its two sides lying parallel to the two sides of the septum disk; filter aid on the outer surface of the covers, means for rotating the central hollow shaft with the filter units at a speed to shed the filter aid with its collected dirt into the water for removal through the drain means, whereby the cover readily holds the filter aid in place on its surface when the filter units are stationary and the water is under pressure but readily sheds the filter aid and collected dirt when the units are rotated, thus avoiding the use of scrapers.

3. The device of claim 2 in which the septum disk is an imperforate plastic sheet, certain of the grooves are in communication with the interior of the central hollow shaft, the filter aid is diatomaceous earth, the cloth is pre-shrunk, and the ribs are equispaced around the plastic disk.

References Cited in the file of this patent

UNITED STATES PATENTS

| | | |
|---|---|---|
| 920,739 | Hedges et al. | May 4, 1909 |
| 1,967,070 | Walker | July 17, 1934 |
| 2,392,354 | Alsop | Jan. 8, 1946 |
| 2,426,618 | Klein | Sept. 2, 1947 |
| 2,444,147 | Walton | June 29, 1948 |
| 2,592,527 | Armstrong | Apr. 15, 1952 |
| 2,697,524 | Foust | Dec. 21, 1954 |
| 2,785,806 | Brown et al. | Mar. 19, 1957 |
| 2,788,901 | Boeddinghaus et al. | Apr. 16, 1957 |
| 2,863,561 | Just et al. | Dec. 9, 1958 |

FOREIGN PATENTS

| | | |
|---|---|---|
| 403,107 | France | Sept. 16, 1909 |
| 655,385 | Great Britain | July 18, 1951 |
| 495,337 | Canada | Aug. 18, 1953 |
| 1,090,663 | France | Oct. 20, 1954 |

OTHER REFERENCES

Textile Fibers Technical Information, Technical Service Section, Textile Fibers Dept., E. I. Dupont de Nemours & Co., Wilmington, Del, January, 1957.